US009619576B2

(12) United States Patent
Kwon et al.

(10) Patent No.: US 9,619,576 B2
(45) Date of Patent: Apr. 11, 2017

(54) MOBILE TERMINAL DISPLAYING PAGE REGION AND HISTORY REGION IN DIFFERENT MANNERS FOR DIFFERENT MODES AND OPERATION CONTROL METHOD THEREOF

(75) Inventors: Joonho Kwon, Seoul (KR); Chungha Yun, Gunpo (KR); Eunyoung Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 336 days.

(21) Appl. No.: 13/369,223

(22) Filed: Feb. 8, 2012

(65) Prior Publication Data

US 2013/0047060 A1  Feb. 21, 2013

(30) Foreign Application Priority Data

Aug. 19, 2011  (KR) .................. 10-2011-0083122

(51) Int. Cl.
    *G06F 17/00* (2006.01)
    *G06F 17/30* (2006.01)

(52) U.S. Cl.
    CPC .............. *G06F 17/30899* (2013.01)

(58) Field of Classification Search
    CPC ............................................ G06F 17/30899
    USPC ........................................ 715/205
    See application file for complete search history.

(56) References Cited

U.S. PATENT DOCUMENTS

| 7,898,541 | B2* | 3/2011 | Hong ..................... G06F 3/0483 345/473 |
| 8,499,251 | B2* | 7/2013 | Petschnigg ........... G06F 3/0483 715/773 |
| 8,850,360 | B2* | 9/2014 | Rosing .................. G06F 3/0483 715/764 |
| 9,026,932 | B1* | 5/2015 | Dixon ................... G06F 3/0483 715/702 |

(Continued)

FOREIGN PATENT DOCUMENTS

JP          2008-76667 A      4/2008
KR   10-2002-0068570 A        8/2002

(Continued)

OTHER PUBLICATIONS

IBM, "Document Skimming by Displaying Multiple Transparent Pages," IP.com No. IPCOM000180109D, http://ip.com/IPCOM/000180109, Mar. 4, 2009, pp. 1-4.*

*Primary Examiner* — Laurie Ries

(74) *Attorney, Agent, or Firm* — Birch, Stewart, Kolasch & Birch, LLP

(57) ABSTRACT

Embodiments discussed herein relate to a mobile terminal providing a user interface capable of more conveniently searching a user's visited web pages. To this end, a mobile terminal according to an embodiment discussed herein may include a storage unit configured to store link information between a first web page and a second web page when the second web page is approached from the first web page; a display unit configured to display a first indicator indicating the first web page and a second indicator indicating the second web page together with the link information; and a controller configured to control the display unit to display a web page corresponding to the selected indicator when either one of the first indicator and second indicator is selected.

7 Claims, 9 Drawing Sheets

(56) References Cited

U.S. PATENT DOCUMENTS

| | | | |
|---|---|---|---|
| 2004/0139143 A1* | 7/2004 | Canakapalli et al. | 709/200 |
| 2005/0257400 A1* | 11/2005 | Sommerer et al. | 36/13 |
| 2006/0074984 A1* | 4/2006 | Milener | G06F 17/30876 |
| 2006/0133664 A1* | 6/2006 | Hong | G06F 3/0483 |
| | | | 382/154 |
| 2006/0194181 A1* | 8/2006 | Rosenberg | G09B 5/06 |
| | | | 434/317 |
| 2009/0244020 A1* | 10/2009 | Sjolin | G06F 3/04883 |
| | | | 345/173 |
| 2010/0066685 A1* | 3/2010 | Cain | G06F 1/1615 |
| | | | 345/173 |
| 2011/0018854 A1* | 1/2011 | Barclay | G06F 1/3203 |
| | | | 345/211 |
| 2011/0066982 A1* | 3/2011 | Paulsami et al. | 715/835 |
| 2011/0163967 A1* | 7/2011 | Chaudhri | G06F 3/0485 |
| | | | 345/173 |
| 2011/0289459 A1* | 11/2011 | Athans et al. | 715/854 |
| 2011/0306304 A1* | 12/2011 | Forutanpour | G06F 3/04883 |
| | | | 455/67.11 |
| 2012/0036324 A1* | 2/2012 | Grunberger | 711/118 |
| 2012/0102424 A1* | 4/2012 | Chong | G06F 3/0483 |
| | | | 715/776 |
| 2012/0113019 A1* | 5/2012 | Anderson | G06F 1/1616 |
| | | | 345/173 |
| 2012/0124505 A1* | 5/2012 | St. Jacques, Jr. | G06F 3/0483 |
| | | | 715/776 |
| 2012/0174121 A1* | 7/2012 | Treat | G06F 9/542 |
| | | | 719/318 |
| 2012/0304082 A1* | 11/2012 | Patten | G06F 3/04883 |
| | | | 715/760 |
| 2012/0311438 A1* | 12/2012 | Cranfill | G06F 17/30011 |
| | | | 715/256 |
| 2013/0021281 A1* | 1/2013 | Tse | G06F 3/0425 |
| | | | 345/173 |

FOREIGN PATENT DOCUMENTS

| | | |
|---|---|---|
| KR | 10-2005-0118877 A | 12/2005 |
| KR | 10-2010-0123356 A | 11/2010 |

\* cited by examiner

MOBILE TERMINAL DISPLAYING PAGE REGION AND HISTORY REGION IN DIFFERENT MANNERS FOR DIFFERENT MODES AND OPERATION CONTROL METHOD THEREOF

CROSS REFERENCE TO RELATED APPLICATIONS

Pursuant to 35 U.S.C. §119(a), this application claims the benefit of earlier filing date and right of priority to Korean Application No. 10-2011-0083122, filed on Aug. 19, 2011, the contents of which is incorporated by reference herein in its entirety.

BACKGROUND OF THE INVENTION

1. Field of the Invention

The present disclosure relates to a mobile terminal, and more particularly, to a mobile terminal having a web browsing function.

2. Description of the Related Art

Terminals can be classified into a mobile terminal and a stationary terminal based on its mobility. Furthermore, terminals can be classified into a handheld terminal and a vehicle mount terminal based on whether or not it can be directly carried by a user.

As it becomes multifunctional, the terminal can be allowed to capture still images or moving images, play music or video files, play games, receive broadcast and the like, so as to be implemented as an integrated multimedia player. Moreover, the improvement of the terminal may be taken into consideration in the aspect of structure or software to support and enhance the function of the terminal.

SUMMARY OF THE INVENTION

Embodiments disclosed herein relates to a mobile terminal providing a user interface capable of more conveniently searching a user's visited web pages.

A mobile terminal according to an embodiment disclosed herein may include a storage unit configured to store link information between a first web page and a second web page when the second web page is approached from the first web page; a display unit configured to display a first indicator indicating the first web page and a second indicator indicating the second web page together with the link information; and a controller configured to control the display unit to display a web page corresponding to the selected indicator when either one of the first indicator and second indicator is selected.

On the other hand, a mobile terminal according to another embodiment disclosed herein may include a display unit configured to display a web page on a screen; an input unit configured to sense a gesture being carried out on the screen; and a controller configured to detect a direction of the sensed gesture and controls the display unit to display a previous or next page of the web page based on the detected direction.

On another hand, an operation control method of a mobile terminal according to still another embodiment disclosed herein may include storing link information between a first web page and a second web page when the second web page is approached from the first web page; displaying a first indicator indicating the first web page and a second indicator indicating the second web page together with the link information; and displaying a web page corresponding to the selected indicator when either one of the first indicator and second indicator is selected.

On still another hand, an operation control method of a mobile terminal according to still another embodiment disclosed herein may include displaying a web page on a screen; sensing a gesture being carried out on the screen; detecting a direction of the sensed gesture; and displaying a previous or next page of the web page based on the detected direction.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
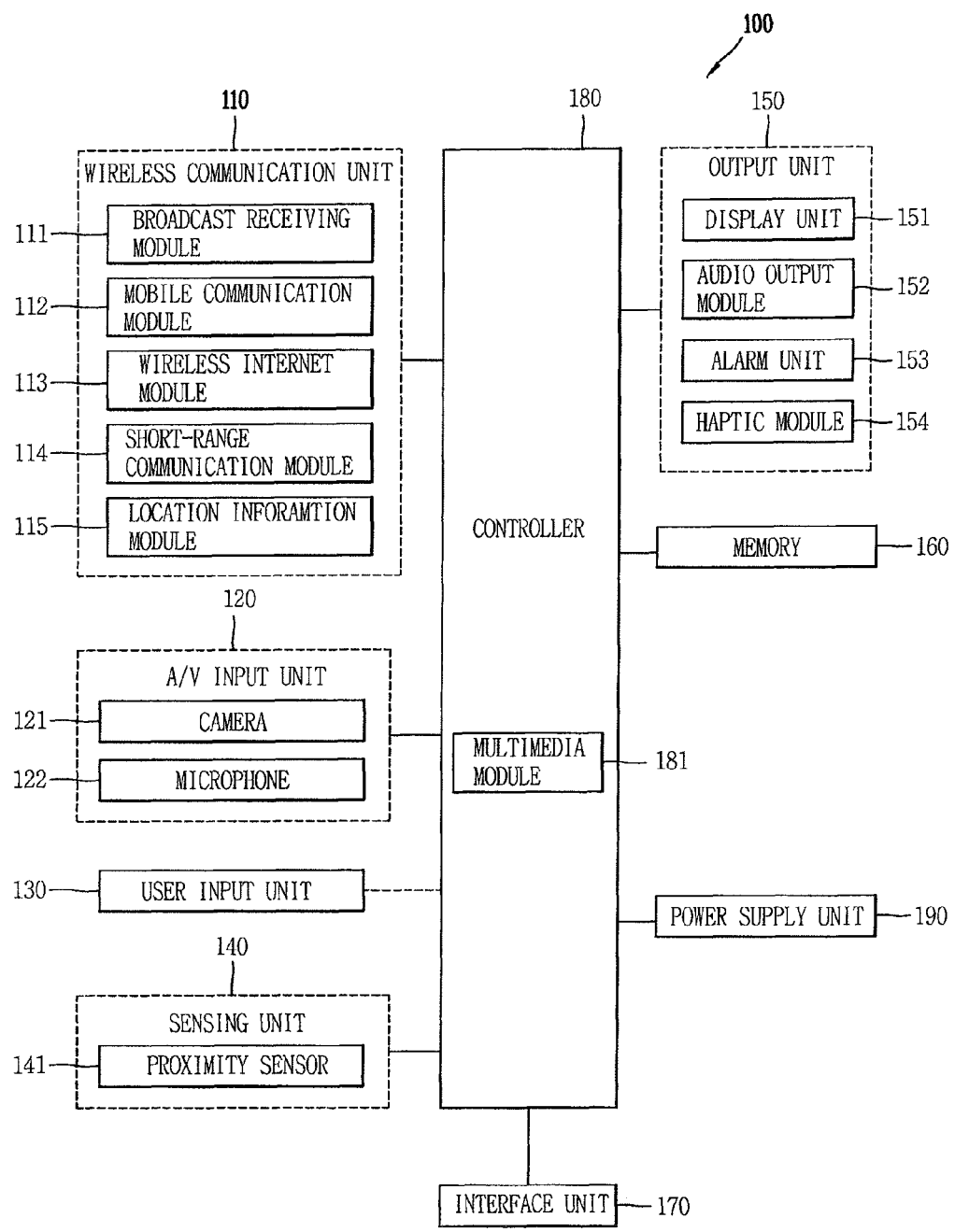
FIG. 1 is a block diagram illustrating a mobile terminal 100 associated with an embodiment of the present invention.

Hereinafter, preferred embodiments of the present invention will be described in detail with reference to the accompanying drawings to such an extent that the present invention can be easily embodied by a person having ordinary skill in the art to which the present invention pertains. However, the present invention may be implemented in various different forms, and therefore, the present invention is not limited to the illustrated embodiments. In order to clearly describe the present invention, parts not related to the description are omitted, and like reference numerals designate like constituent elements throughout the specification.

A mobile terminal disclosed herein may include a portable phone, a smart phone, a laptop computer, a digital broadcast mobile device, a personal digital assistant (PDA), a portable multimedia player (PMP), a navigation, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 associated with an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the constituent elements 110-190 of the mobile terminal 100 will be described in sequence.

The wireless communication unit 110 may include one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and broadcast associated information from an external broadcast management server through a broadcast channel. The broadcast associated information may mean information regarding a broadcast channel, a broadcast program, a broadcast service provider, and the like. The broadcast associated information may also be provided through a mobile communication network. In this case, the broadcast associated information may be received by the mobile communication module 112. The broadcast signal and broadcast-associated information received through the broadcast receiving module 111 may be stored in the memory 160.

The mobile communication module 112 transmits and/or receives a radio signal to and/or from at least one of a base station, an external terminal and a server over a mobile communication network. The radio signal may include a voice call signal, a video call signal or various types of data according to text and/or multimedia message transmission and reception.

The wireless Internet module 113 as a module for supporting wireless Internet access may be built-in or externally installed to the mobile terminal 100. A variety of wireless Internet access techniques may be used, such as WLAN (Wireless LAN), Wi-Fi, Wibro (Wireless Broadband), Wimax (World Interoperability for Microwave Access), HSDPA (High Speed Downlink Packet Access), and the like.

The short-range communication module 114 refers to a module for supporting a short-range communication. A variety of short-range communication technologies may be used, such as Bluetooth, Radio Frequency IDentification (RFID), Infrared Data Association (IrDA), Ultra WideBand (UWB), ZigBee, and the like.

The location information module 115 is a module for acquiring a location of the mobile terminal 100, and there is a GPS module as a representative example.

Subsequently, referring to FIG. 1, the A/V (audio/video) input unit 120 receives an audio or video signal, and the A/V (audio/video) input unit 120 may include a camera 121, a microphone 122, and the like. The camera 121 processes an image frame, such as still or moving images, obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated during the process of receiving the external audio signal.

The user input unit 130 may generate input data to control an operation of the mobile terminal 100. The user input unit 130 may be configured with a keypad, a dome switch, a touch pad (pressure/capacitance), a jog wheel, a jog switch, and the like.

The sensing unit 140 detects presence or absence of the user's contact, and a current status of the mobile terminal 100 such as an opened or closed configuration, a location of the mobile terminal 100, an orientation of the mobile terminal 100, an acceleration or deceleration of the mobile terminal 100, and the like, and generates a sensing signal for controlling the operation of the mobile terminal 100. For example, when the mobile terminal 100 is a slide phone type, the sensing unit 140 may sense an opened or closed configuration of the slide phone. Furthermore, the sensing unit 140 may sense whether or not power is supplied from the power supply unit 190, or whether or not an external device is coupled to the interface unit 170.

The sensing unit 140 may include a proximity sensor 141. Furthermore, the sensing unit 140 may include a touch sensor (not shown) for sensing a touch operation with respect to the display unit 151.

The touch sensor may be implemented as a touch film, a touch sheet, a touch pad, and the like. The touch sensor may be configured to convert changes of a pressure applied to a specific part of the display unit 151, or a capacitance generated from a specific part of the display unit 151, into electric input signals. The touch sensor may be configured to sense not only a touched position and a touched area, but also a touch pressure.

When the touch sensor and display unit 151 forms an interlayer structure, the display unit 151 may be used as an input device rather than an output device. The display unit 151 may be referred to as a "touch screen".

When there is a touch input through the touch screen, the corresponding signals may be transmitted to a touch controller (not shown). The touch controller processes signals transferred from the touch sensor, and then transmits data corresponding to the processed signals to the controller 180. Accordingly, the controller 180 may sense which region of the display unit 151 has been touched.

When the touch screen is a capacitance type, the proximity of a sensing object may be detected by changes of an electromagnetic field according to the proximity of a sensing object. The touch screen may be categorized into a proximity sensor 141.

The proximity sensor 141 refers to a sensor for detecting the presence or absence of a sensing object using an electromagnetic field or infrared rays without a mechanical contact. The proximity sensor 141 has a longer lifespan and more enhanced utility than a contact sensor. The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like.

Hereinafter, for the sake of convenience of explanation, the behavior of a sensing object being placed in proximity with the touch screen without being brought into contact with the touch screen may be referred to as a "proximity touch", whereas the behavior of a sensing object being brought into contact with the touch screen may be referred to as a "contact touch".

The proximity sensor 141 may sense the presence or absence of a proximity touch and a proximity touch pattern (for example, a proximity touch distance, a proximity touch direction, a proximity touch velocity, a proximity touch time, a proximity touch position, a proximity touch moving state, etc.) Information corresponding to the presence or absence of a proximity touch and the proximity touch pattern may be displayed on the touch screen.

The output unit 150 may generate an output associated with visual, auditory, tactile senses. The output unit 150 may include a display unit 151, an audio output module 153, an alarm unit 154, a haptic module 155, and the like.

The display unit 151 may display (output) information processed in the mobile terminal 100. For example, when the mobile terminal 100 is operated in a phone call mode, the display unit 151 may display a user interface (UI) or graphic user interface (GUI) associated with a phone call. When the mobile terminal 100 is operated in a video call mode or image capturing mode, the display unit 151 may display a captured image, a received image, UI, GUI, or the like.

The display unit 151 may include at least one of a liquid crystal display (LCD), a thin film transistor-liquid crystal display (TFT-LCD), an organic light emitting diode (OLED) display, a flexible display, a three-dimensional (3D) display, and an e-ink display.

At least one of those displays (or display devices) included in the display unit 151 may be configured with a transparent or optical transparent type to allow the user to view the outside therethrough. It may be referred to as a transparent display. A representative example of the transparent display may be a transparent OLED (TOLED), and the like. Under this configuration, the user can view an object positioned at a rear side of the mobile device body through a region occupied by the display unit 151 of the mobile device body.

There may exist two or more display units 151 according to an implementation of the mobile terminal 100. For example, a plurality of the display units 151 may be placed on one surface in a separate or integrated manner, or may be place on different surfaces, respectively.

The audio output module 152 may output audio data received from the wireless communication unit 110 or stored in the memory 160, in a call-receiving mode, a call-placing mode, a recording mode, a voice recognition mode, a broadcast reception mode, and the like. The audio output module 152 may output an audio signal associated with a function carried out in the mobile terminal 100 (for example, sound alarming a call received or a message received, and the like). The audio output module 152 may include a receiver, a speaker, a buzzer, and the like.

The alarm unit 153 outputs signals notifying the occurrence of an event from the mobile terminal 100. The examples of an event occurring from the mobile terminal 100 may include a call received, a message received, a key signal input, a touch input, and the like. The alarm unit 153 may output not only video or audio signals, but also other types of signals such as signals for notifying the occurrence of an event in a vibration manner. Since the video or audio signals may be also output through the display unit 151 or the audio output unit 152, and/or the display unit 151 and the audio output module 152 may be categorized into part of the alarm unit 153.

The haptic module 154 generates various tactile effects that can be felt by the user. A representative example of the tactile effects generated by the haptic module 154 may include vibration. Vibration generated by the haptic module 154 may have a controllable intensity, a controllable pattern, and the like. For example, different vibrations may be output in a synthesized manner or in a sequential manner.

The haptic module 154 may generate various tactile effects, including not only vibration, but also arrangement of pins vertically moved with respect to a skin surface being touched, air injection force or air suction force through an injection port or suction port, touch by a skin surface, contact with an electrode, effects by stimulus such as an electrostatic force, reproduction of cold or hot feeling using a heat absorbing device or heat emitting device, and the like.

The haptic module 154 may be configured to transmit tactile effects through the user's direct contact, or the user's muscular sense using a finger or a hand. Two or more haptic modules 154 may be provided according to the configuration of the mobile terminal 100.

The memory 160 may store a program for operating the controller 180, or temporarily store input/output data (for example, phonebooks, messages, still images, moving images, and the like). The memory 160 may store data related to various patterns of vibrations and sounds outputted when performing a touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

The interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize a handwriting or drawing input on the touch screen as text or image.

The power supply unit 190 may receive external or internal power to provide power required by various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, the method of processing a user input to the mobile terminal 100 will be described.

The user input unit 130 is manipulated to receive a command for controlling the operation of the mobile terminal 100, and may include a plurality of manipulation units. The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in the form of a character, a numeral, a symbol, a graphic, an icon, and the like. For an input of the visual information, at least one of a character, a numeral, a symbol, a graphic, and an icon may be displayed with a predetermined arrangement so as to be implemented in the form of a keypad. Such a keypad may be referred to as a so-called "soft key."

The display unit 151 may operate on an entire region or operate by dividing into a plurality of regions. In case of the latter, the plurality of regions may be configured to operate in an associative way. For example, an output window and an input window may be displayed on the upper and lower portions of the display unit 151, respectively. The output window and the input window may be regions allocated to output or input information, respectively. A soft key on which numerals for inputting a phone number or the like are displayed is outputted on the input window. When the soft key is touched, a numeral corresponding to the touched soft key is displayed on the output window. When the first manipulating unit is manipulated, a phone call connection for the phone number displayed on the output window will be attempted or a text displayed on the output window will be entered to the application.

The display unit 151 or touch pad may be configured to sense a touch scroll. The user may move an object displayed on the display unit 151, for example, a cursor or pointer placed on an icon or the like, by scrolling the display unit 151 or touch pad. Moreover, when a finger is moved on the display unit 151 or touch pad, a path being moved by the finger may be visually displayed on the display unit 151. It may be useful to edit an image displayed on the display unit 151.

In order to cope with a case where the display unit 151 and touch pad are touched together within a predetermined period of time, one function of the terminal 100 may be implemented. For the case of being touched together, there is a case when the user clamps a body of the mobile terminal 100 using his or her thumb and forefinger. For one of the above functions implemented in the mobile terminal 100, for example, there may be an activation or de-activation for the display unit 151 or touch pad.

The memory 160 according to an embodiment disclosed herein may store link information between a first web page and a second web page when the second web page is approached from the first web page. Furthermore, the display unit 151 may display a first indicator indicating the first web page and a second indicator indicating the second web page together with the link information. Furthermore, the controller 180 may control the display unit to display a web page corresponding to the selected indicator when either one of the first indicator and second indicator is selected.

The display unit 151 may display the first indicator and second indicator in a tree format together with the link information, and display a web page corresponding to the selected indicator together with the first indicator, the second indicator and the link information. Furthermore, the display unit 151 may display the first indicator, the second indicator and the link information to be overlapped with or adjacent to the selected web page, and display the first indicator and second indicator together with the link information when a history providing menu of visited web pages is selected.

Here, the first indicator and second indicator may be thumbnails of the corresponding web pages, and reflect a uniform resource identifier (URI) of the corresponding web pages. Furthermore, the memory 160 may store the link information between the first web page and the second web page when the second web page is approached through a hyperlink included in the first web page.

On the other hand, the display unit 151 according to another embodiment disclosed herein may display a web page on a screen. Furthermore, the input unit 130 may sense a gesture being carried out on the screen. Furthermore, the controller 180 may detect a direction of the sensed gesture and control the display unit to display a previous or next page of the web page based on the detected direction.

The display unit 151 may also display an indicator corresponding to the previous or next page together with the web page, wherein the indicator is a preview of the previous page or next page. Furthermore, the display unit 151 may display a partial region of the previous or next page while the gesture is sensed. Meanwhile, the memory 160 may store the displayed web page in an image format.

First Embodiment

Figure 2:
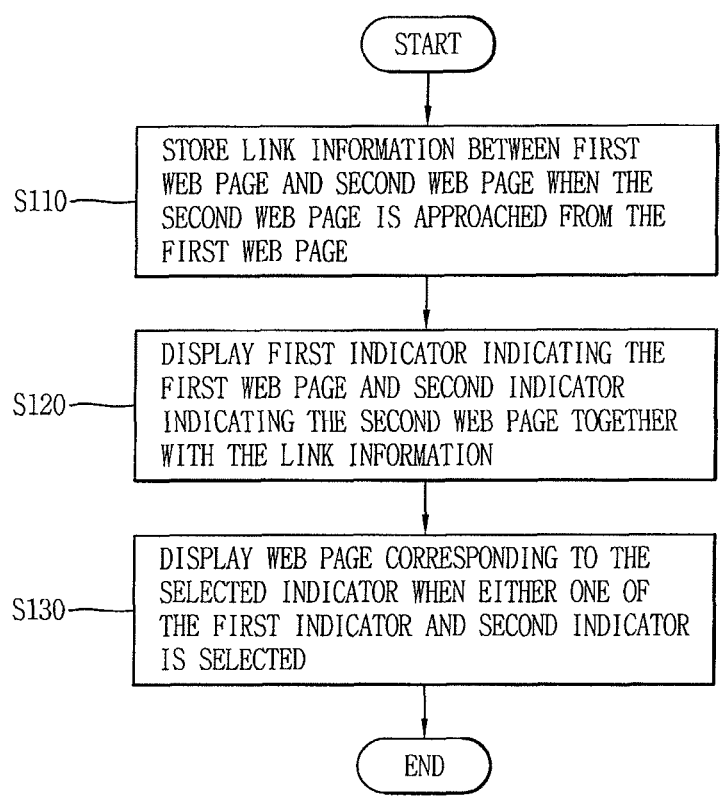
FIG. 2 is a flow chart for explaining an operation control method of the mobile terminal 100 according to an embodiment disclosed herein.

FIG. 2 is a flow chart for explaining an operation control method of the mobile terminal 100 according to an embodiment disclosed herein. Referring to FIG. 2, an operation control method of the mobile terminal 100 may include storing link information between a first web page and a second web page when the second web page is approached from the first web page (S110), displaying a first indicator indicating the first web page and a second indicator indicating the second web page together with the link information (S120), and displaying a web page corresponding to the selected indicator when either one of the first indicator and second indicator is selected (S130).

Here, said displaying the indicators together with the link information (S120) may be displaying the first indicator and second indicator in a tree format together with the link information.

Furthermore, said displaying the indicators together with the link information (S120) may be displaying a web page corresponding to the selected indicator together with the first indicator, the second indicator and the link information. Furthermore, said displaying the indicators together with the link information (S120) may be displaying the first indicator, the second indicator and the link information to be overlapped with or adjacent to the selected web page.

Furthermore, said displaying the indicators together with the link information (S120) may be displaying the first indicator and second indicator together with the link information when a history providing menu of visited web pages is selected.

Furthermore, the first indicator and second indicator may be thumbnails of the corresponding web pages. Furthermore, the first indicator and second indicator may reflect a uniform resource identifier (URI) of the corresponding web pages.

Furthermore, said storing step may be storing the link information between the first web page and the second web page when the second web page is approached through a hyperlink included in the first web page.

Hereinafter, operational examples of the mobile terminal 100 according to the foregoing operation control method will be described in detail.

Figure 3A:
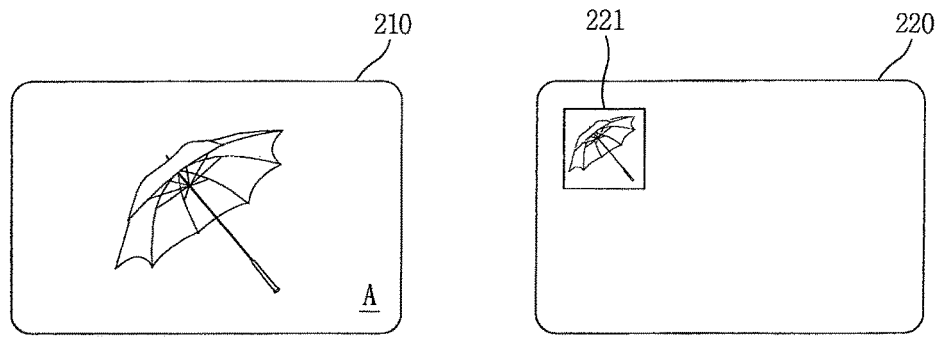
FIGS. 3A through 3C are conceptual views illustrating an operational example of the mobile terminal 100 according to an embodiment of the control method illustrated in FIG. 2.
Figure 3B:
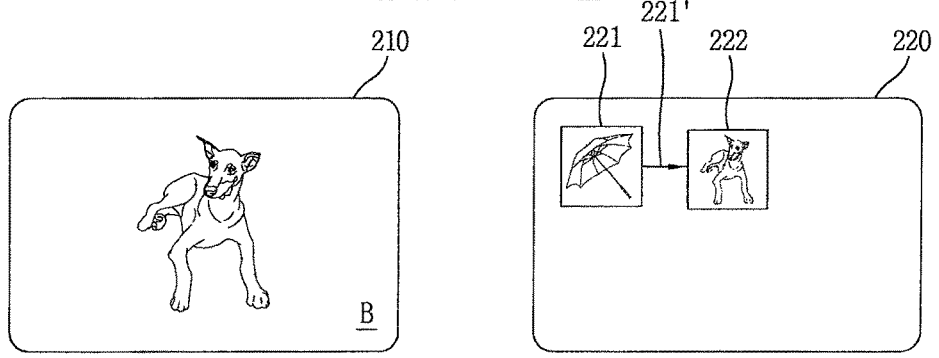
Figure 3C:
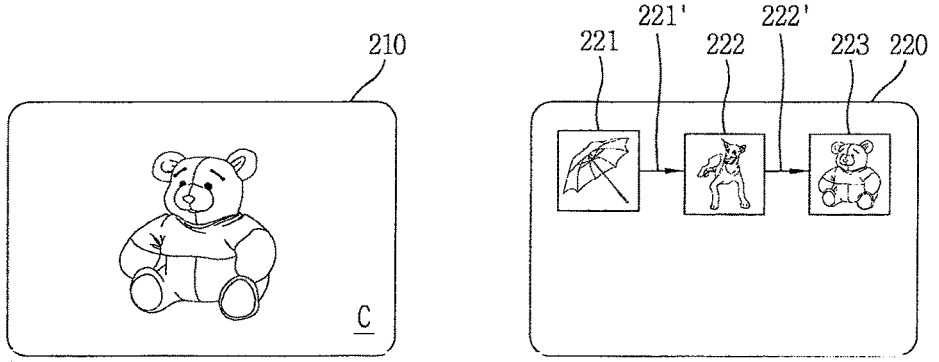

FIGS. 3A through 3C are conceptual views illustrating an operational example of the mobile terminal 100 according to the control method illustrated in FIG. 2.

Referring to FIG. 3A, the mobile terminal 100 may implement a web browsing application, and approaches a specific page A via a network according to a page display request to display page A on a page display region 210. Then, the mobile terminal 100 may store information 221 on page A, for example, an identifier, a title, a thumbnail, and the like. The stored information on page A may be displayed on a history region 220.

Referring to FIG. 3B, as a hyperlink of page B included in page A is selected in a state that page A is displayed in the page display region 210, the mobile terminal 100 can approach another page B via a network to display page B in the page display region 210. Then, the mobile terminal 100 may store information 222 on page B. Furthermore, the mobile terminal 100 may store link information 221' between pages A and B. The stored link information 221' may be displayed in a tree format in the history region 220 together with the information 221 on page A and the information 222 on page B.

Referring to FIG. 3C, as a hyperlink of page C included in page B is selected in a state that page B is displayed in the page display region 210, the mobile terminal 100 can approach still another page C via a network to display page C in the page region 210. Then, the mobile terminal 100 may store information 223 on page C. Furthermore, the mobile terminal 100 may store link information 222' between pages B and C. The stored link information 222' may be displayed in a tree format in the history region 220 together with the information 222 on page B and the information 223 on page C.

Referring to FIGS. 3A through 3C, information 221-223 on pages displayed in the history region 220 may be implemented in selectable items (or menus). Accordingly, if an item for a page displayed in the history region 220 is selected, then the mobile terminal 100 may display a page corresponding to the selected item in the page region 210. To this end, the information 221-223 on pages may reflect a uniform resource identifier (URI) of the corresponding pages.

As a result, it may be possible to intuitively grasp a web page visit history and provide a user interface allowing the user to effectively approach visited pages. For example, when the user desires to switch to page A in a state that page C is displayed in the page display region 210, a burden of successively inputting previous page display commands twice can be removed.

Figure 4A:
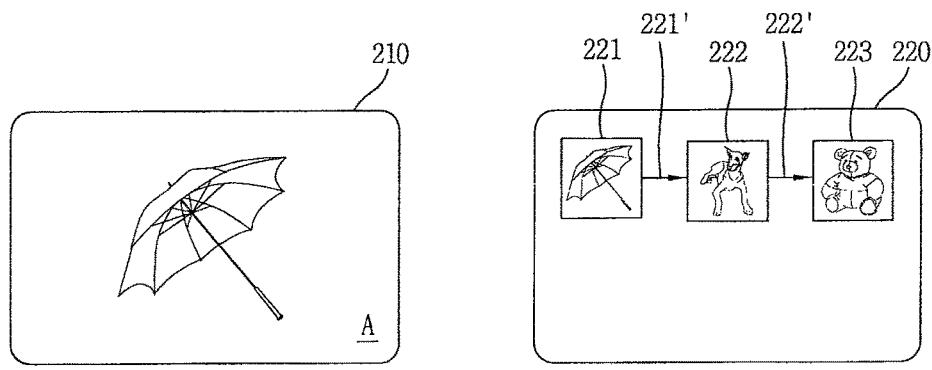
FIGS. 4A through 4C are other conceptual views illustrating an operational example of the mobile terminal 100 according to an embodiment of the control method illustrated in FIG. 2.
Figure 4B:
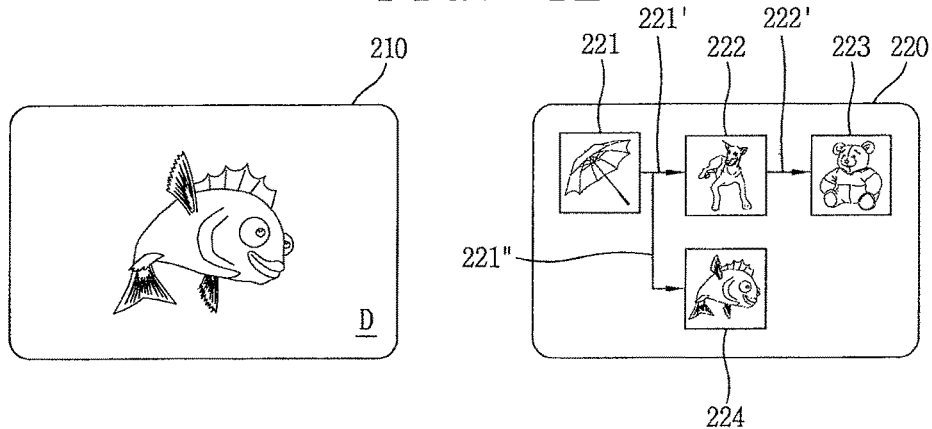
Figure 4C:
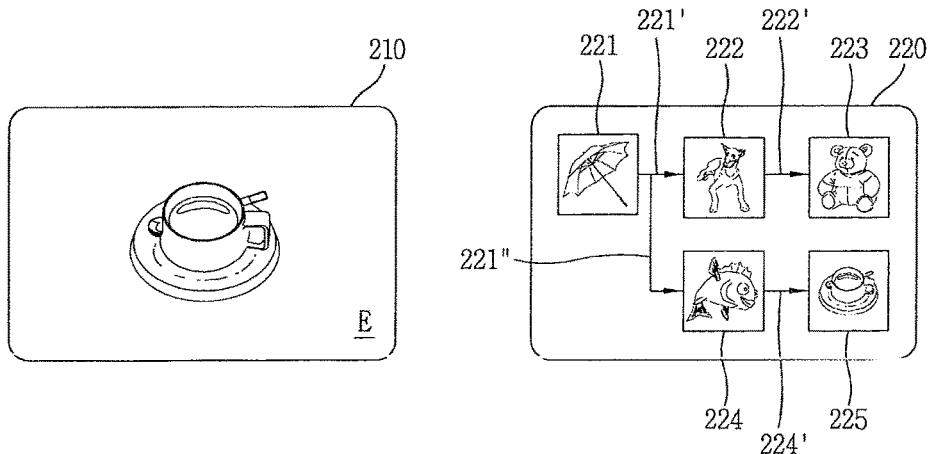

FIGS. 4A through 4C are other conceptual views illustrating an operational example of the mobile terminal 100 according to the control method illustrated in FIG. 2.

Referring to FIG. 4A, subsequently to the foregoing FIG. 3C, if an item 221 corresponding to page A is selected among the items displayed in the history region 220, then page A may be displayed in the page region 210.

Referring to FIG. 4B, as a hyperlink of page D included in page A is selected in a state that page A is displayed in the page display region 210, the mobile terminal 100 can approach another page D via a network to display page D in the page display region 210. Then, the mobile terminal 100 may store information 224 on page B. Furthermore, the mobile terminal 100 may store link information 221" between pages A and D. The stored link information 221" may be displayed in a tree format in the history region 220 together with the information 221 on page A and the information 224 on page D.

Referring to FIG. 4C, as a hyperlink of page E included in page D is selected in a state that page D is displayed in the page display region 210, the mobile terminal 100 can approach still another page E via a network to display page E in the page region 210. Then, the mobile terminal 100 may store information 225 on page E. Furthermore, the mobile terminal 100 may store link information 224' between pages D and E. The stored link information 224' may be displayed in a tree format in the history region 220 together with the information 224 on page D and the information 225 on page E.

Referring to FIGS. 4A through 4C, information 221-225 on pages displayed in the history region 220 may be implemented in selectable items (or menus). Accordingly, if an item for a page displayed in the history region 220 is selected, then the mobile terminal 100 may display a page corresponding to the selected item in the page region 210. To this end, the information 221-225 on pages may reflect a uniform resource identifier (URI) of the corresponding pages.

As a result, it may be possible to intuitively grasp a web page visit history and provide a user interface allowing the user to effectively approach visited pages. For example, when the user desires to switch to page B in a state that page D is displayed in the page display region 210, a burden of successively inputting previous page display commands twice and then selecting a hyperlink of page B again can be removed.

Figure 5A:
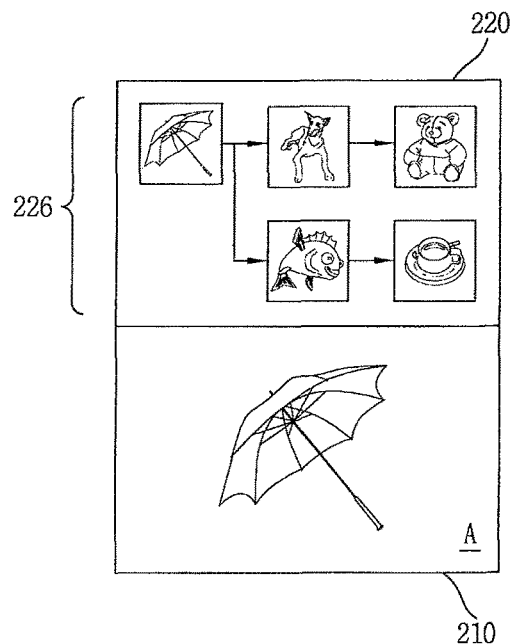
FIGS. 5A and 5B are still another conceptual view illustrating an operational example of the mobile terminal 100 according to an embodiment of the control method illustrated in FIG. 2.
Figure 5B:
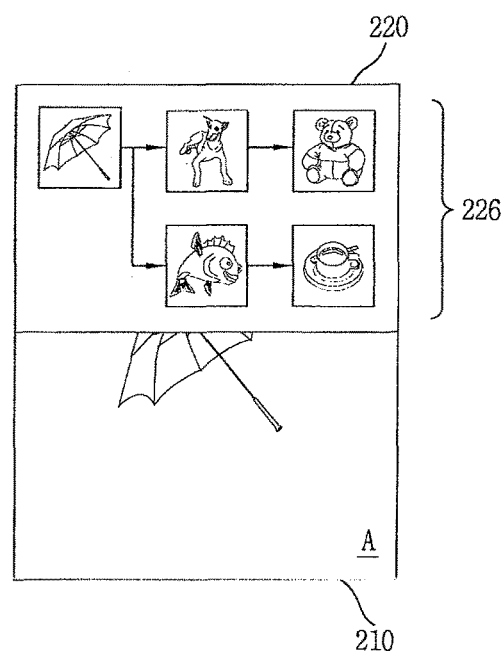

FIGS. 5A and 5B are still another conceptual view illustrating an operational example of the mobile terminal 100 according to the control method illustrated in FIG. 2.

The page region 210 described with reference to FIGS. 3 and 4 may occupy a partial or entire region of the screen basically provided by a web browsing application. Furthermore, if a history display command is applied by the user (for example, a history display menu provided by the web browsing application is selected), then the history region 220 may be displayed with a partial or entire region of the screen provided by the web browsing application. Furthermore, the history region 220 may be displayed to be overlapped with or adjacent to the page.

For example, referring to FIG. 5A, the history region 220 for displaying information on pages and link information 226 between pages may be displayed to be adjacent to the page display region 210 for displaying page A. In particular, such a method can be further usefully applied to a mode in which a horizontal length is displayed longer than a vertical length.

Furthermore, for example, referring to FIG. 5B, the history region 220 for displaying information on pages and link information 226 between pages may be displayed to be overlapped with the page display region 210 for displaying page A. In particular, such a method can be further usefully applied to a mode in which a vertical length is displayed longer than a horizontal length.

Second Embodiment

Figure 6:
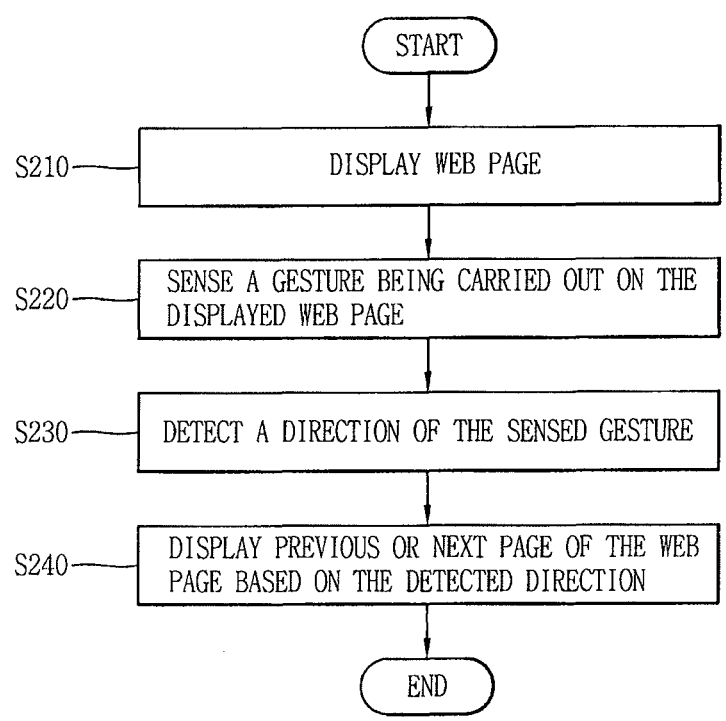
FIG. 6 is a flow chart for explaining an operation control method of the mobile terminal 100 according to an embodiment disclosed herein.

FIG. 6 is a flow chart for explaining an operation control method of the mobile terminal 100 according to an embodiment disclosed herein. Referring to FIG. 6, an operation control method of the mobile terminal 100 may include displaying a web page on a screen (S210), sensing a gesture being carried out on the screen (S220), detecting a direction of the sensed gesture (S230), and displaying a previous or next page of the web page based on the detected direction (S240).

Here, said displaying a web page on the screen (S210) may be displaying an indicator corresponding to the previous or next page together with the web page. Furthermore, the indicator may be a preview of the previous page or next page.

In addition, said sensing a gesture may be displaying a partial region of the previous or next page while the gesture is sensed. Furthermore, the operation control method may further include the step of storing the displayed web page in an image format.

Figure 7:
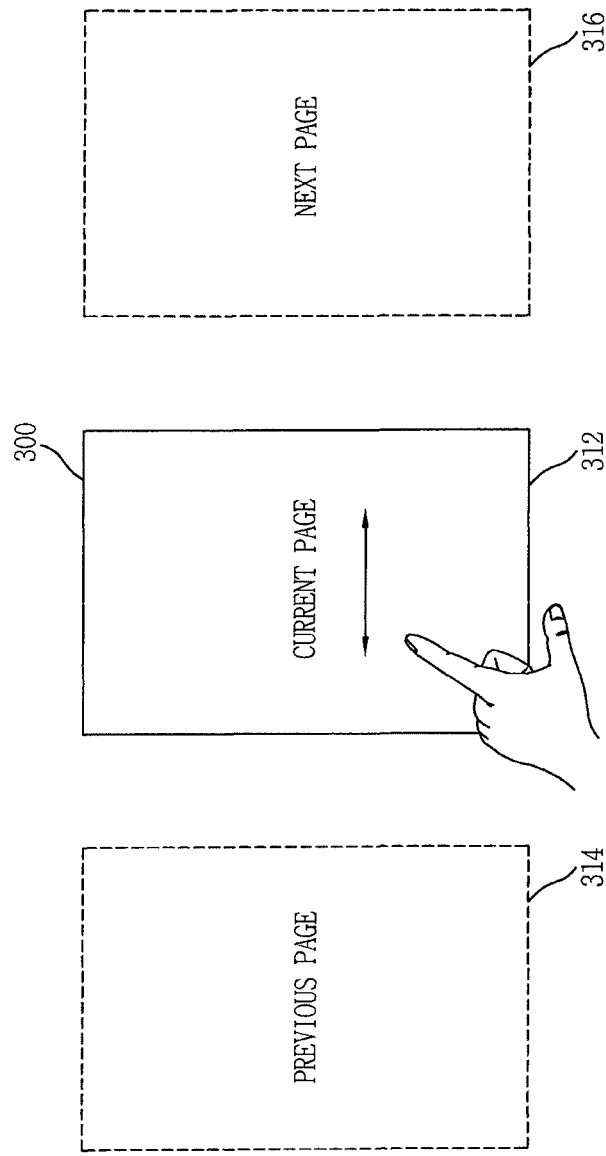
FIG. 7 is a conceptual view illustrating an operational example of the mobile terminal 100 according to an embodiment of the control method illustrated in FIG. 6.

FIG. 7 is a conceptual view illustrating an operational example of the mobile terminal 100 according to the control method illustrated in FIG. 6.

Referring to FIG. 7, the mobile terminal 100 may implement a web browsing application, and approach a specific page via a network according to a page display request to display the page 312 on the screen 300. Then, the mobile terminal 100 may sense a gesture being carried out on the screen 300. For example, the mobile terminal 100 may sense a gesture through a touch operation (for example, drag, swipe, etc.) being carried out on the touch screen or the movement of an object of interest (for example, the user's finger, stylus pen, etc.) captured in a taken image.

Then, the mobile terminal 100 may analyze the direction of the sensed gesture to display a page (previous page) 314 displayed prior to displaying the page 312 on the screen 300 when the analyzed direction is a first direction, and display a page (next page) 316 displayed subsequent to displaying page 312 on the screen 300 when the analyzed direction is a second direction. The first and the second direction may be opposite to each other. For example, if the first direction is a right direction, then the second direction may be a left direction.

Figure 8:
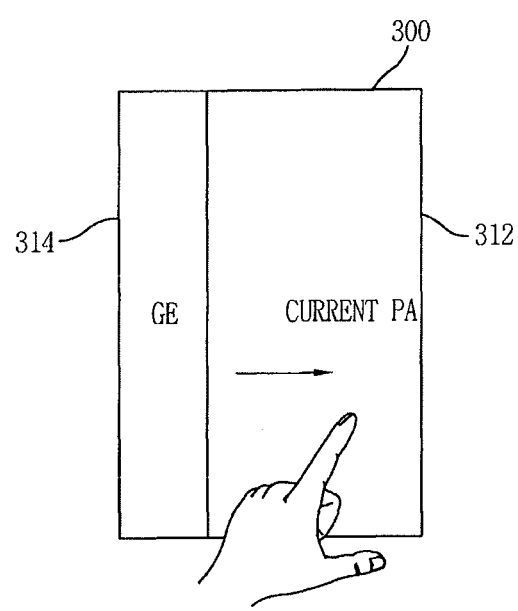
FIG. 8 is another conceptual view illustrating an operational example of the mobile terminal 100 according to an embodiment of the control method illustrated in FIG. 6.

FIG. 8 is another conceptual view illustrating an operational example of the mobile terminal 100 according to the control method illustrated in FIG. 6.

Referring to FIG. 8, the mobile terminal 100 may display a current page 312 on the screen 300 subsequent to displaying a previous page 314. In this state, the mobile terminal 100 may sense a gesture in the first direction. In this case, part of the previous page 314 may be displayed in proportion to a level in progress of the gesture being sensed (for example, length). Furthermore, part of the current page 312 may be disappeared in proportion to a level in progress of the gesture being sensed as the current page 312 being moved in a direction of the gesture.

When a gesture is completed, for example, when a gesture with a length above the threshold is sensed, the current page 312 may be completely disappeared on the screen 300, and the previous page 314 may be completely displayed on the screen 300. When a gesture is terminated while a gesture with a length less than the threshold is sensed, the previous page 314 may be completely disappeared on the screen 300, and the current page 312 may be completely displayed again on the screen 300.

Since pages that can be approached by a gesture are all pages that have been displayed up to the present, when displaying a page, if the corresponding page or an image (for example, thumbnail) corresponding to the corresponding page has been previously stored, then switching to a previous page or another page from a current page can be smoothly implemented according to a level of the gesture.

Figure 9:
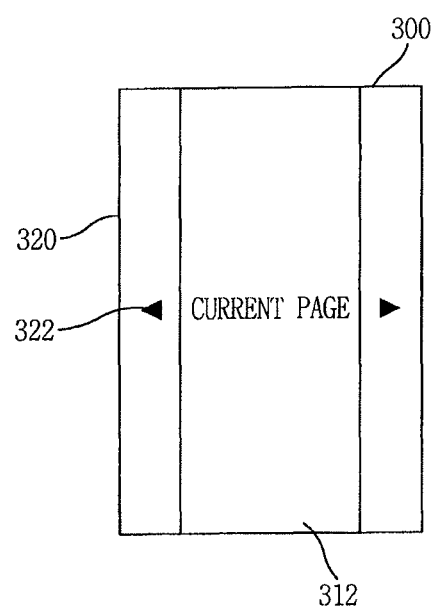
FIG. 9 is still another conceptual view illustrating an operational example of the mobile terminal 100 according to an embodiment of the control method illustrated in FIG. 6.

FIG. 9 is still another conceptual view illustrating an operational example of the mobile terminal 100 according to the control method illustrated in FIG. 6.

Referring to FIG. 9, the mobile terminal 100 may implement a web browsing application, and approach a specific page via a network according to a page display request to display the page 312 on the screen 300. Then, the mobile terminal 100 may sense a gesture being carried out on the screen 300. At this time, the mobile terminal 100 may sense start of a gesture, for example, start of a touch operation or start of the movement of an object of interest, and display an indicator 322 reflecting a switchable page in the indicator region 320 when start of a gesture has been sensed.

The indicator 322 may be a preview of the corresponding page. If there exists no corresponding page, then the corresponding indicator region 320 may not be displayed thereon or an indicator corresponding to the relevant page may not be displayed in the indicator region 320. Accordingly, the user may check an indicator to perform a gesture for moving to his or her desired page.

According to an embodiment disclosed herein, visited web pages may be displayed in a hierarchical manner, thereby providing a user interface capable of intuitively grasping the history, and more conveniently approaching the visited web pages. Furthermore, according to an embodiment disclosed herein, it may be possible to provide an interface capable of conveniently moving to a previous or next page of the currently displayed page using a gesture based user interface.

Furthermore, according to an embodiment of the present invention, the foregoing method may be implemented as codes readable by a processor on a medium written by the program. Examples of the processor-readable media may include ROM, RAM, CD-ROM, magnetic tape, floppy disk, and optical data storage device, and the like, and also include a device implemented via a carrier wave (for example, a transmission via the Internet).

The configurations and methods according to the above-described embodiments will not be applicable in a limited way to the foregoing mobile terminal disclosed herein, and all or part of each embodiment may be selectively combined and configured to make various modifications thereto.

What is claimed is:

1. A mobile terminal, comprising:
   a memory configured to store link information, the link information being information about a link between a first web page and a second web page that is stored when the second web page is approached from the first web page;
   a display configured to display the second web page on a page region and simultaneously display a first indicator indicating the first web page, a second indicator indicating the second web page in a tree format together with an indicator corresponding to the link information on a history region; and
   a controller configured to:
   detect a selection of one of the first indicator and the second indicator, and control the display to display a web page corresponding to the selected one of the first indicator and the second indicator,
   control the display to display the page region and the history region in a screen dividing manner in a horizontal view mode, and to display the history region to be overlapped with the page region in a vertical view mode,
   reduce a size of left and right sides of a current page in a center direction when a touch is applied to the current page and preview a previous page and a next page in vacant spaces created by the reduced current page while the applied touch is maintained, and
   switch the current page into the previous page or the next page according to a movement direction when the applied touch is moved, the previous page and the next page indicating pages that have been displayed on the history region.

2. The mobile terminal of claim 1, wherein the controller is configured to control the display to display the first indicator, the second indicator and the indicator corresponding to the link information to be overlapped with or adjacent to the web page corresponding to the selected one of the first indicator and the second indicator.

3. The mobile terminal of claim 1, wherein the controller is configured to control the display to display the first indicator and second indicator together with the indicator corresponding to the link information when a history providing menu of visited web pages is selected.

4. The mobile terminal of claim 1, wherein the first indicator and second indicator are thumbnails of the first web page and the second web page, respectively.

5. The mobile terminal of claim 1, wherein the first indicator and second indicator reflect a uniform resource identifier (URI) of the first web page and the second web page, respectively.

6. The mobile terminal of claim 1, wherein the controller is configured to control the memory to store the link information when the second web page is approached through a hyperlink included in the first web page.

7. The mobile terminal of claim 1, wherein the controller is configured to display only the current page after the applied touch is removed.

* * * * *